(12) United States Patent
Nakayama et al.

(10) Patent No.: US 11,888,411 B2
(45) Date of Patent: Jan. 30, 2024

(54) POWER CONVERSION DEVICE

(71) Applicants: Mitsubishi Electric Corporation, Tokyo (JP); Toshiba Mitsubishi-Electric Industrial Systems Corporation, Tokyo (JP)

(72) Inventors: Akito Nakayama, Tokyo (JP); Taichiro Tsuchiya, Tokyo (JP); Jumpei Isozaki, Tokyo (JP)

(73) Assignees: MITSUBISHI ELECTRIC CORPORATION, Tokyo (JP); TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 289 days.

(21) Appl. No.: 17/606,047

(22) PCT Filed: Jul. 1, 2019

(86) PCT No.: PCT/JP2019/026111
§ 371 (c)(1),
(2) Date: Oct. 25, 2021

(87) PCT Pub. No.: WO2021/001888
PCT Pub. Date: Jan. 7, 2021

(65) Prior Publication Data
US 2022/0239231 A1     Jul. 28, 2022

(51) Int. Cl.
*H02M 3/335*     (2006.01)
*H02M 7/483*     (2007.01)
(Continued)

(52) U.S. Cl.
CPC ........... *H02M 7/4835* (2021.05); *H02M 1/08* (2013.01); *H02M 1/32* (2013.01);
(Continued)

(58) Field of Classification Search
CPC ........ H02M 7/4835; H02M 1/08; H02M 1/32; H02M 3/335; H02M 3/33523; H02M 7/483; H02M 7/4833
See application file for complete search history.

(56) References Cited

U.S. PATENT DOCUMENTS 11,722,050 B2 *  8/2023  Yachida .............. H02M 1/0048
                                                        363/65
2016/0141965 A1    5/2016  Hasegawa et al.
(Continued)

FOREIGN PATENT DOCUMENTS

EP     2549634 A1    1/2013
EP     3 242 389 A1  11/2017
(Continued)

OTHER PUBLICATIONS

International Search Report and Written Opinion dated Sep. 17, 2019, received for PCT Application PCT/JP2019/026111, Filed on Jul. 1, 2019, 7 pages including English Translation.
(Continued)

*Primary Examiner* — Adolf D Berhane
(74) *Attorney, Agent, or Firm* — XSENSUS LLP

(57) ABSTRACT

A main circuit power supply device includes: a plurality of voltage-division power storage elements connected in series; voltage adjustment circuits for adjusting each of voltages of the plurality of voltage-division power storage elements through mutual transfer of power between the plurality of voltage-division power storage elements; and at least one DC/DC converter which is connected to at least one of the voltage-division power storage elements and supplies a control power source to a main circuit control circuitry to control a main circuit.

20 Claims, 13 Drawing Sheets

(51) Int. Cl.
  *H02M 1/08* (2006.01)
  *H02M 1/32* (2007.01)
(52) U.S. Cl.
  CPC ....... *H02M 3/33523* (2013.01); *H02M 7/483* (2013.01); *H02M 7/4833* (2021.05)

(56) References Cited

U.S. PATENT DOCUMENTS

| | | |
|---|---|---|
| 2018/0006551 A1 | 1/2018 | Park et al. |
| 2023/0208300 A1* | 6/2023 | Taniguchi ............. H02M 3/157 323/271 |
| 2023/0307943 A1* | 9/2023 | Kato ....................... H02J 9/068 307/64 |

FOREIGN PATENT DOCUMENTS

| | | |
|---|---|---|
| JP | 2004-23834 A | 1/2004 |
| JP | 2011-193615 A | 9/2011 |
| JP | 2015-19537 A | 1/2015 |
| JP | 2015-130743 A | 7/2015 |

OTHER PUBLICATIONS

Senturk et al., "High Voltage Cell Power Supply for Modular Multilevel Converters", IEEE Energy Conversion Congress and Exposition (ECCE), doi: 10.1109/ECCE.2014.6953725, 2014, pp. 4416-4420.

Extended European Search Report dated Jun. 9, 2022, in corresponding European Patent Application 19936497.7.

Ma Yan et al: "Equalization of Lithium-Ion Battery Pack Based on Fuzzy Logic Control in Electric Vehicle", IEEE Transactions on Industrial Electronics, IEEE Service Center, Piscataway, NJ, USA, vol. 65, No. 8, Aug. 1, 2018 (Aug. 1, 2018), pp. 6762-6771, XP011682195, ISSN: 0278-0046, DOI: 10.1109/TIE.2018.2795578 [retrieved on Mar. 30, 2018].

Ashaibi A A et al: "Switched mode power supplies for charge-up, discharge and balancing de-link capacitors of diode-clamped five-level inverter", The Institution of Engineering and Technology. Journal,, vol. 3, No. 4, Jul. 1, 2010 (Jul. 1, 2010), pp. 612-628, XP006035843, ISSN: 1755-4543, DOI: 10.1049/IET-PEL:20080335.

\* cited by examiner

POWER CONVERSION DEVICE

CROSS-REFERENCE TO RELATED APPLICATION

The present application is based on PCT filing PCT/JP2019/026111, filed Jul. 1, 2019, the entire contents of which are incorporated herein by reference.

TECHNICAL FIELD

The present disclosure relates to a power conversion device.

BACKGROUND ART

For a grid power conversion device or the like, a main circuit power supply method may be used for supplying power to a control device present at a high-potential part in the power conversion device. In the main circuit power supply method, a circuit for supplying power to the control device is provided in the high-potential part and thus there is an advantage that the dielectric withstand voltage needed for the power supply circuit can be significantly reduced.

As a circuit for supplying power to a gate driving power source from a main circuit at high voltage, a circuit in which inputs of DC/DC converters are connected in series and outputs thereof are connected in parallel, is disclosed (for example, Patent Document 1).

As another circuit example, it is disclosed that capacitors connected in series and switches and resistors connected in parallel to the capacitors are used to perform control so that each capacitor voltage does not reach overvoltage, and power is supplied from one of the voltage division capacitors to a gate driving power source using a DC/DC converter (for example, Patent Document 2).

CITATION LIST

Patent Document

Patent Document 1: Japanese Laid-Open Patent Publication No. 2015-19537 (paragraphs [0009] and [0010] to [0012], and FIGS. 1 and 2)
Patent Document 2: Japanese Laid-Open Patent Publication No. 2004-23834 (paragraphs [0006] and [0007], and FIG. 1)

SUMMARY OF THE INVENTION

Problems to be Solved by the Invention

In the circuit disclosed in Patent Document 1, the input side and the output side of the DC/DC converter have different potentials and therefore need to be insulated from each other using a transformer, thus causing a problem of increasing the size of the power supply circuit.

In the circuit disclosed in Patent Document 2, the voltage of the voltage division capacitor is discharged through the circuit having the resistor, thus causing a problem of increasing loss.

The present disclosure has been made to solve the above problems, and aims to provide a power conversion device that enables size reduction of a main circuit power supply device and enables reduction in loss.

Solution to the Problems

A power conversion device according to the present disclosure includes: a main circuit including a main circuit switching element and a main circuit power storage element; a main circuit control device for controlling the main circuit; and a main circuit power supply device for supplying a control power source from the main circuit power storage element to the main circuit control device. The main circuit power supply device includes: a plurality of voltage-division power storage elements connected in series; a voltage adjustment circuit which is connected to the plurality of voltage-division power storage elements and adjusts each of voltages of the plurality of voltage-division power storage elements through mutual transfer of power between the plurality of voltage-division power storage elements; and at least one DC/DC converter which is connected to at least one of the plurality of voltage-division power storage elements and supplies the control power source.

Effect of the Invention

The power conversion device according to the present disclosure achieves a power conversion device that enables size reduction of a main circuit power supply device and enables reduction in loss.

DESCRIPTION OF EMBODIMENTS

Embodiment 1

Embodiment 1 relates to a power conversion device including: a main circuit including a main circuit switching element and a main circuit power storage element; a main circuit control device for controlling the main circuit; and a main circuit power supply device for supplying a control power source from the main circuit power storage element to the main circuit control device, wherein the main circuit power supply device includes a plurality of voltage-division power storage elements connected in series, a voltage adjustment circuit which is connected to the plurality of voltage-division power storage elements and adjusts each of voltages of the plurality of voltage-division power storage elements through mutual transfer of power between the plurality of voltage-division power storage elements, and at least one DC/DC converter which is connected to at least one of the plurality of voltage-division power storage elements and supplies the control power source.

Figure 1:
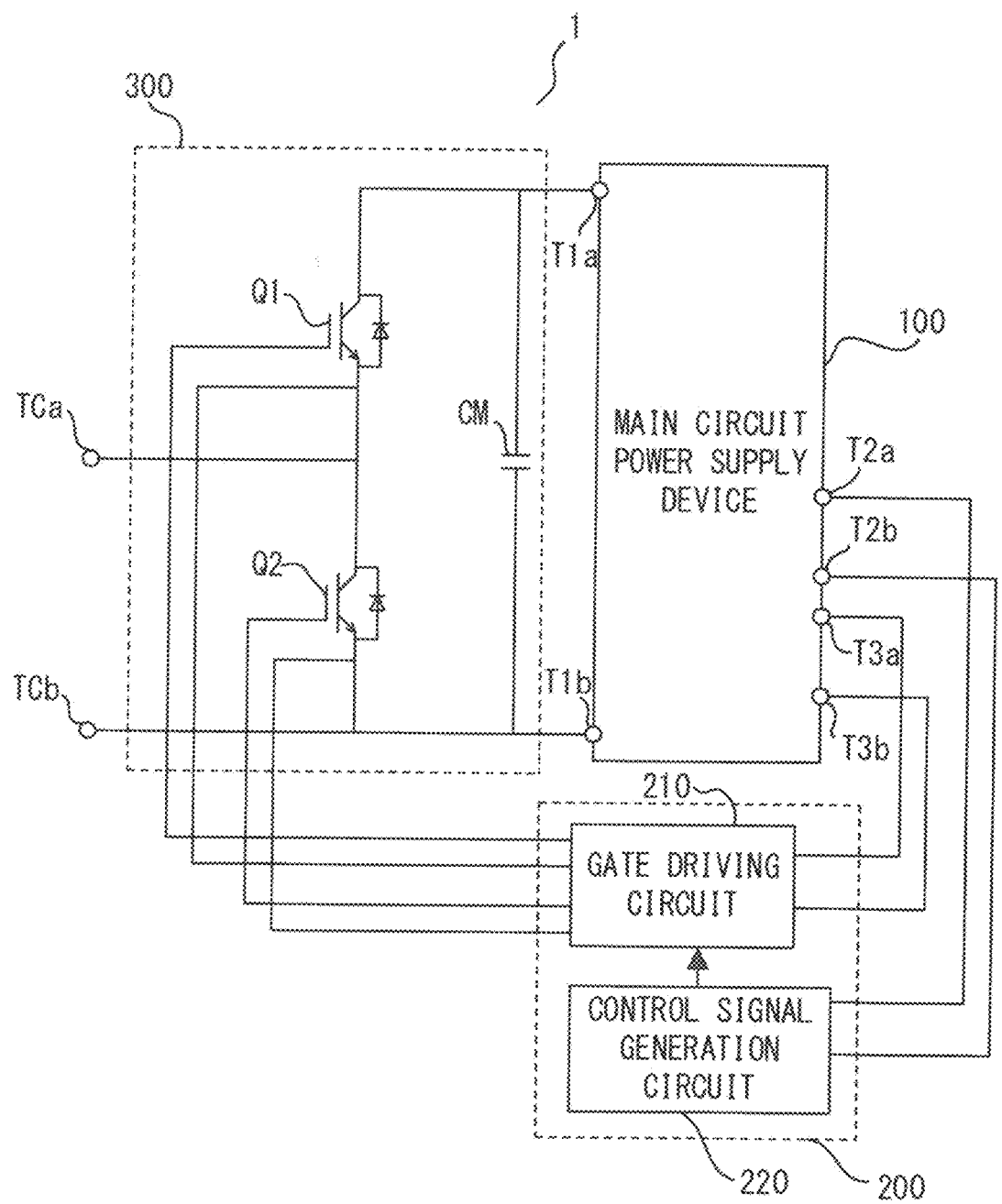
FIG. 1 is a block diagram showing the schematic configuration of a power conversion device according to embodiment 1.
Figure 2:
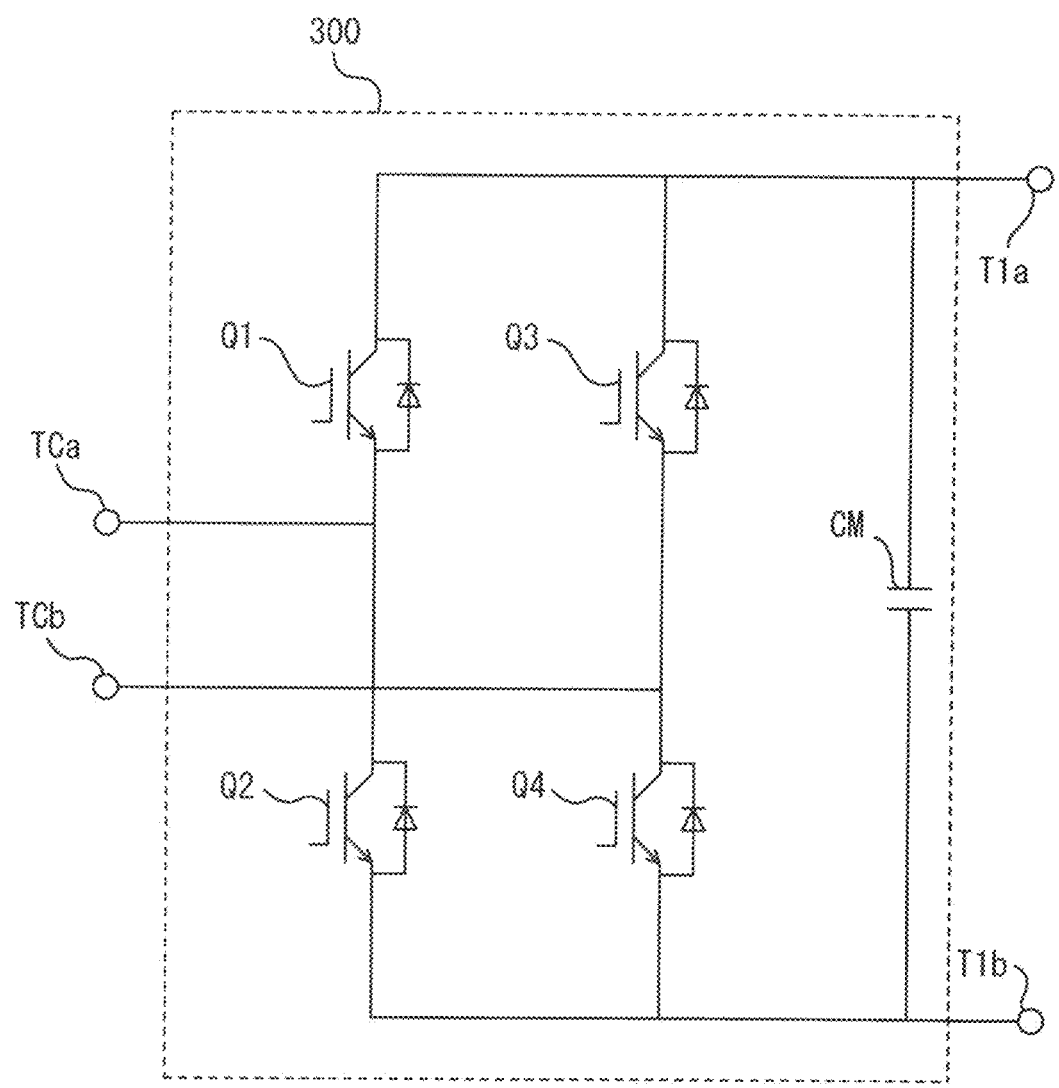
FIG. 2 is a circuit configuration diagram showing another configuration of a main circuit in the power conversion device according to embodiment 1.

Hereinafter, the configuration and operation of the power conversion device according to embodiment 1 will be described with reference to FIG. 1 which is a block diagram showing the schematic configuration of the power conversion device, FIG. 2 which is a circuit configuration diagram showing another configuration of the main circuit, FIG. 3 which is a circuit configuration diagram of the main circuit power supply device, FIG. 4 to FIG. 6 which are circuit configuration diagrams showing modifications of the main circuit power supply device, FIG. 7 which is a basic configuration diagram of the voltage adjustment circuit, FIG. 8 which is a circuit configuration diagram of the voltage adjustment circuit, and FIG. 9 which is a circuit configuration diagram of the DC/DC converter.

The configuration and the function of the power conversion device according to embodiment 1 will be described with reference to FIG. 1.

A power conversion device 1 includes a main circuit power supply device 100, a main circuit control device 200, and a main circuit 300.

The main circuit 300 includes main circuit switching elements Q1, Q2 and a main circuit power storage element CM. The main circuit control device 200 includes a gate driving circuit 210 and a control signal generation circuit 220.

As the main circuit switching elements Q1, Q2 in the present embodiment 1, any self-turn-off semiconductor switching elements such as insulated gate bipolar transistors (IGBT), metal-oxide-semiconductor filed effect transistors (MOSFET), gate commutated turn-off (GCT) elements, or thyristors, may be used. Freewheeling diodes (FWD) are connected in antiparallel to the self-turn-off semiconductor switching elements.

The semiconductor switching elements may be elements made from Si, or may be elements made from a wide bandgap semiconductor such as SiC or GaN (SiC-MOSFET or GaN-high electron mobility transistor (HEMT)). As the FWDs, parasitic diodes of the semiconductor switching elements may be used.

The main circuit 300 in embodiment 1 is one unit converter used for a modular multilevel converter. The configuration thereof is assumed to be a half-bridge cell shown in FIG. 1. However, a full-bridge cell having main circuit switching elements Q1, Q2, Q3, Q4 shown in FIG. 2 may be adopted.

The main circuit 300 has main circuit terminals TCa, TCb to be connected to another unit converter.

The configuration of the main circuit 300 may be any circuitry without limitation to a certain purpose or application, as long as the main circuit power storage element CM is provided and power conversion of voltage and energy of the main circuit power storage element CM is performed using the switching elements. Further, the number of the switching elements and the types and the numbers of other elements are also not limited.

The main circuit power supply device 100 in embodiment 1 is configured to supply power to the main circuit 300 and the main circuit control device 200 from the main circuit power storage element CM.

In the main circuit control device 200, the gate driving circuit 210 drives the main circuit switching elements Q1, Q2 of the main circuit 300, and the control signal generation circuit 220 outputs a control signal to the gate driving circuit 210.

In embodiment 1, the main circuit control device 200 includes the gate driving circuit 210 and the control signal generation circuit 220. However, the main circuit control device 200 may be a general device used for driving or controlling the switching elements and mechanical switches in the main circuit 300, and the components thereof are not limited to the gate driving circuit 210 and the control signal generation circuit 220. In addition, the number of the components is not limited.

Next, the configuration and operation of the main circuit power supply device 100 will be described with reference to FIG. 3 which is the circuit configuration diagram of the main circuit power supply device 100.

The main circuit power supply device 100 includes voltage-division power storage elements C1, C2, C3, C4, C5, voltage adjustment circuits BC1, BC2, BC3, BC4, and a DC/DC converter 110.

Further, the main circuit power supply device 100 includes main circuit power supply device input terminals T1a, T1b, control signal generation circuit power source terminals T2a, T2b, and gate driving circuit power source terminals T3a, T3b.

For simplifying the description, for example, the main circuit power supply device input terminal T1a may be referred to as input terminal T1a, the control signal generation circuit power source terminal T2a may be referred to as power source terminal T2a, and the gate driving circuit power source terminal T3a may be referred to as power source terminal T3a.

The voltage-division power storage elements C1 to C5 are connected in series between the input terminal T1a and the input terminal T2a.

The input side of the DC/DC converter 110 is connected to one voltage-division power storage element C5, and the output side thereof is connected to the power source terminals T2a, T2b and the power source terminals T3a, T3b.

Hereinafter, for facilitating the understanding and simplifying the description, each of the voltage-division power storage elements C1 to C5 connected in series is denoted by Ck (k is an integer in a range of 1≤k≤5).

With respect to elements X1 to X5 of the main circuit power supply device 100 (here, X is a symbol of each element and represents the voltage-division power storage element C, a protection circuit switch S and a protection circuit resistor R described later, etc.), the kth element X from the high-potential side is denoted by Xk.

Figure 3:
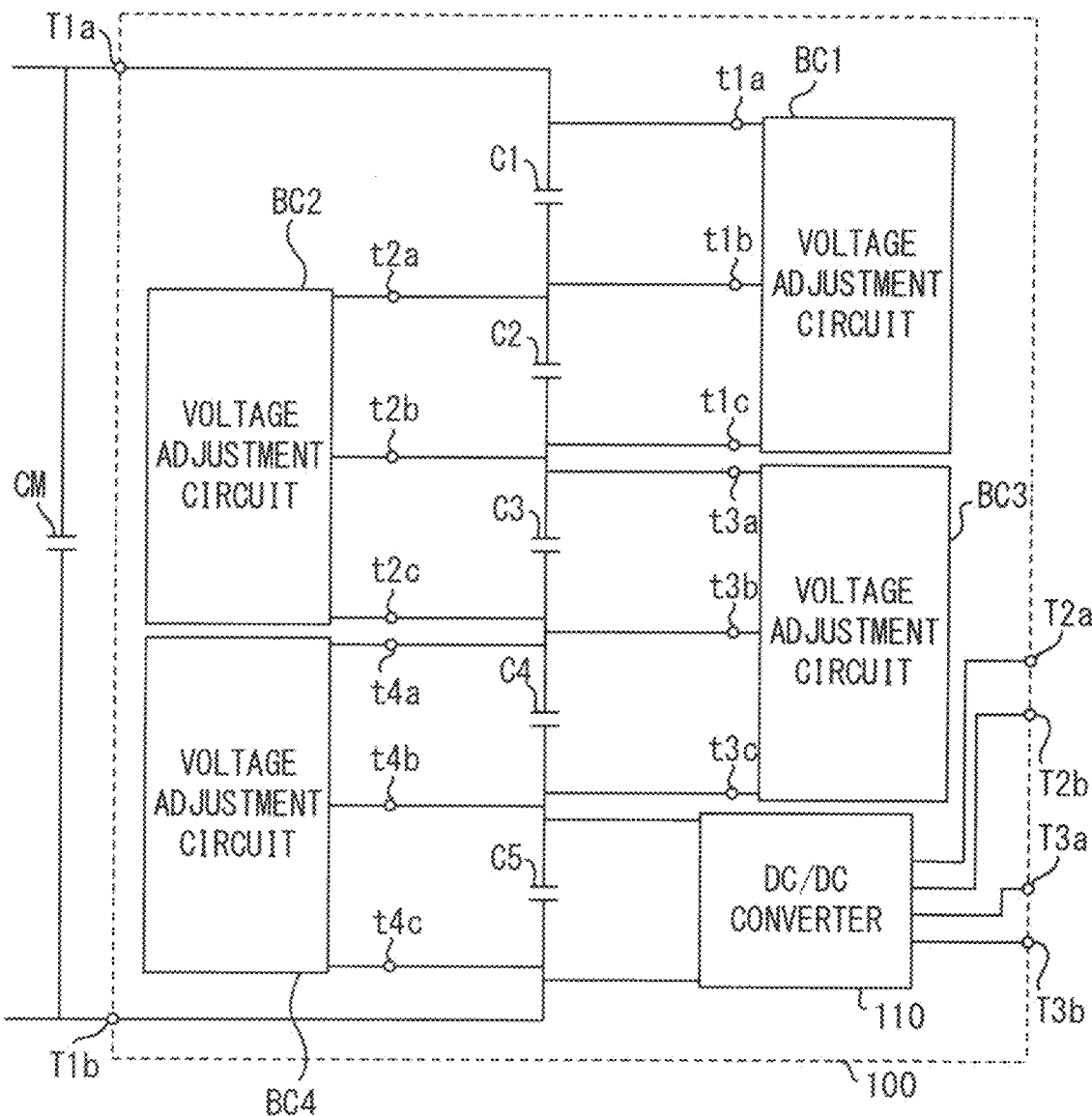
FIG. 3 is a circuit configuration diagram of a main circuit power supply device in the power conversion device according to embodiment 1.

In FIG. 3, the voltage adjustment circuit BCk has three voltage adjustment circuit terminals tka, tkb, tkc (specifically, t1a, t1b, t1c, t2a, t2b, t2c, t3a, t3b, t3c, t4a, t4b, t4c), and is connected to two voltage-division power storage elements Ck and C(k+1).

For simplifying the description, for example, the voltage adjustment circuit terminal tka is referred to as terminal tka.

The terminal tkb of the voltage adjustment circuit BCk other than the terminal tka on the high-voltage side and the terminal tkc on the low-voltage side is connected to the terminal t(k−1)c on the low-voltage side of another voltage adjustment circuit BC(k−1), the terminal t(k+1)a on the high-voltage side of another voltage adjustment circuit BC(k+1), or both of them.

As a result of such connection, among all the voltage adjustment circuits BC1 to BC4, two voltage adjustment circuits BCk and BC(k+1) are connected to the voltage-division power storage element C(k+1) in common.

To describe with the reference characters omitted for simplification, each voltage adjustment circuit is connected to a set of at least two voltage-division power storage elements among the three or more voltage-division power storage elements connected in series, and a part of the set of voltage-division power storage elements to which one voltage adjustment circuit is connected and a part of at least two voltage-division power storage elements to which another voltage adjustment circuit is connected, overlap each other.

Thus, the voltage-division power storage element C1 passes/receives power to/from the voltage-division power storage element C2 via the voltage adjustment circuit BC1. Then, the voltage-division power storage element C2 that has passed/received power passes/receives power to/from the voltage-division power storage element C3 via the voltage adjustment circuit BC2. The voltage-division power storage element C3 passes/receives power to/from the voltage-division power storage element C4 via the voltage adjustment circuit BC3. The voltage-division power storage element C4 passes/receives power to/from the voltage-division power storage element C5 via the voltage adjustment circuit BC4.

As described above, power can be mutually transferred between all the voltage-division power storage elements C1 to C5, and as a result, voltages of all the voltage-division power storage elements C1 to C5 can be adjusted.

Next, modifications of the main circuit power supply device 100 will be described with reference to FIG. 4 to FIG. 6.

Figure 4:
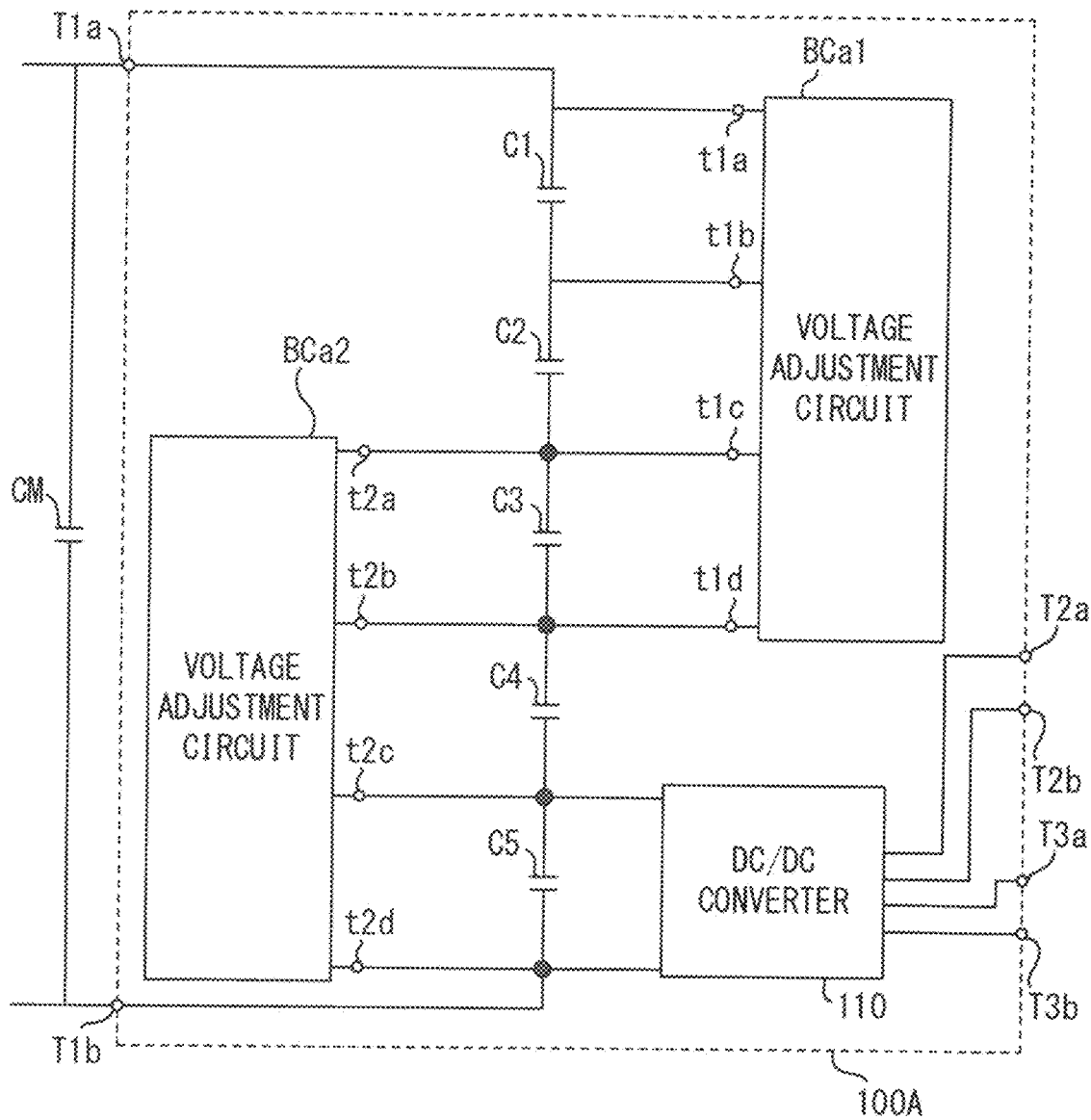
FIG. 4 is a circuit configuration diagram showing a modification of the main circuit power supply device in the power conversion device according to embodiment 1.
Figure 5:
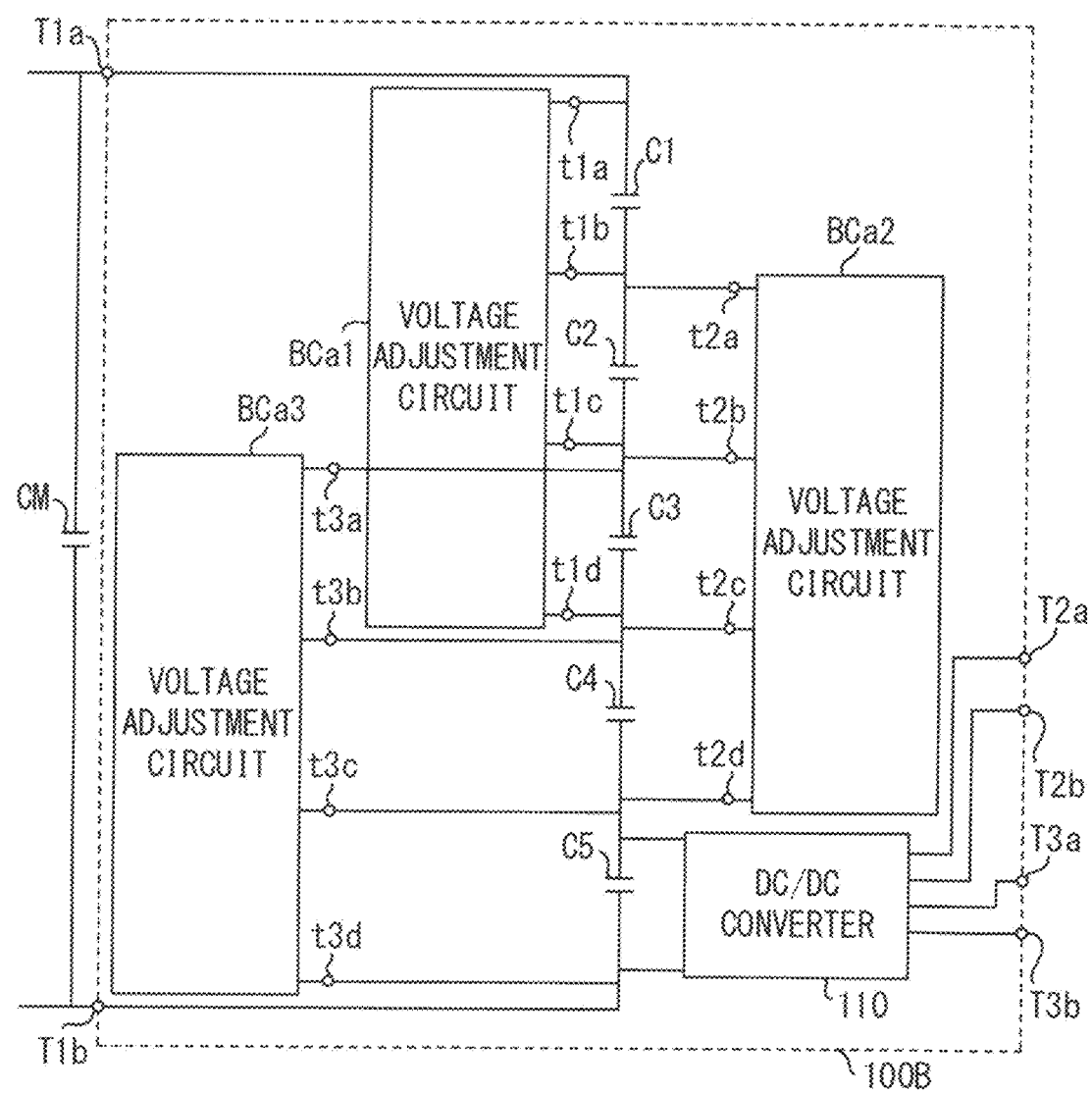
FIG. 5 is a circuit configuration diagram showing a modification of the main circuit power supply device in the power conversion device according to embodiment 1.

A voltage adjustment circuit BCak in FIG. 4 and FIG. 5 includes four voltage adjustment circuit terminals tka to tkd.

For discrimination from the voltage adjustment circuit BCk having the three terminals tka to tkc in FIG. 3, the voltage adjustment circuit having the four terminals tka to tkd (specifically, t1a, t1b, t1c, t1d, t2a, t2b, t2c, t2d, t3a, t3b, t3c, t3d, t4a, t4b, t4c, t4d) is referred to as voltage adjustment circuit BCak. For discrimination, the main circuit power supply device in FIG. 4 is referred to as main circuit power supply device 100A, and the main circuit power supply device in FIG. 5 is referred to as main circuit power supply device 100B.

In FIG. 4, the voltage adjustment circuit BCak is connected to three voltage-division power storage elements C(2k−1) to C(2k+1). Here, the voltage adjustment circuit BCa1 and the voltage adjustment circuit BCa2 are connected to the voltage-division power storage element C3 in common.

In FIG. 5, the voltage adjustment circuit BCak is connected to three voltage-division power storage elements Ck to C(k+2). Here, the voltage adjustment circuit BCa1 and the voltage adjustment circuit BCa2 are connected to the voltage-division power storage elements C2 and C3 in common. The voltage adjustment circuit BCa2 and the voltage adjustment circuit BCa3 are connected to the voltage-division power storage elements C3 and C4 in common.

In the modifications of the main circuit power supply device 100 shown in FIG. 4 and FIG. 5, at least one of the voltage-division power storage elements to which the voltage adjustment circuit BCak is connected is connected also to the voltage adjustment circuit BCa(k+1).

With such a configuration, it is possible to perform voltage adjustment independently for the voltage-division power storage elements to which each voltage adjustment circuit BCak is connected. The voltage adjustment is performed with at least one voltage-division power storage element shared with another voltage adjustment circuit BCak, and as a result, power is mutually transferred between all the voltage-division power storage elements C1 to C5 and voltages of all the voltage-division power storage elements C1 to C5 can be adjusted.

Figure 6:
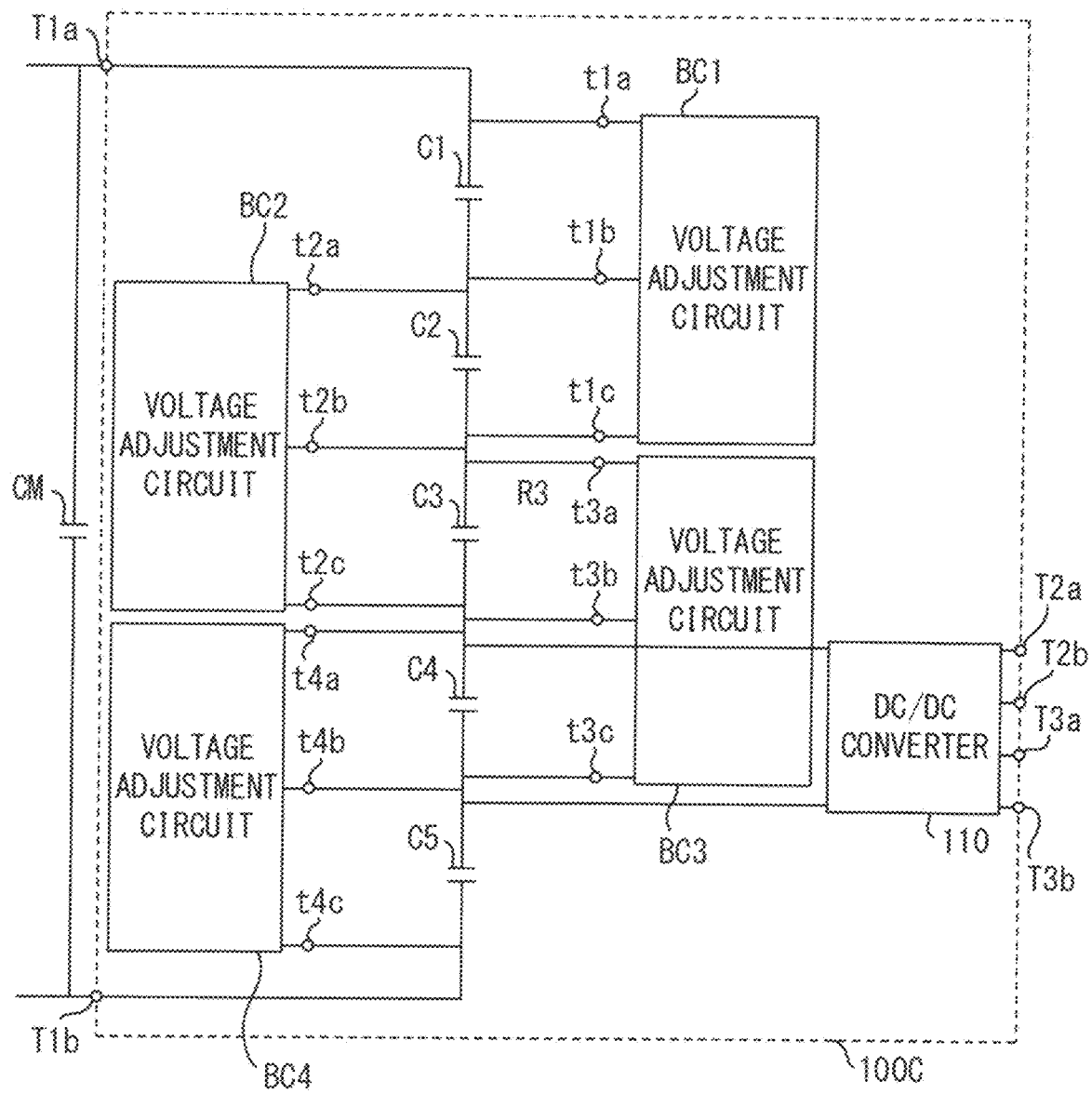
FIG. 6 is a circuit configuration diagram showing a modification of the main circuit power supply device in the power conversion device according to embodiment 1.

Further, FIG. 6 shows another modification of the main circuit power supply device 100.

The voltage adjustment circuits BC1 to BC4 in FIG. 3 have functions of adjusting voltages of the voltage-division power storage elements C1 to C5. Therefore, as shown in FIG. 6, the DC/DC converter 110 may be connected to any voltage-division power storage element Ck. In FIG. 6, the DC/DC converter 110 is connected to the voltage-division power storage element C4.

In FIG. 6, for discrimination, the main circuit power supply device is referred to as main circuit power supply device 100C.

While several modifications of the main circuit power supply device are shown in FIG. 4 to FIG. 6, the numbers and the connection configurations of the voltage-division power storage elements Ck, the voltage adjustment circuits BCk, and the DC/DC converter 110 are not limited and another modification is possible, within the scope of the present embodiment.

In the main circuit power supply device shown in FIG. 3 to FIG. 6, the input side of the DC/DC converter 110 is connected to one voltage-division power storage element (e.g., C5). However, the input side of the DC/DC converter 110 may be connected to a series circuit of a plurality of voltage-division power storage elements (e.g., a series circuit of C4 and C5).

In the following description, it is assumed that the main circuit power supply device 100 shown in FIG. 3 is applied.

Next, the configuration and operation of the voltage adjustment circuit BCk will be described with reference to FIG. 7 and FIG. 8.

Figure 7:
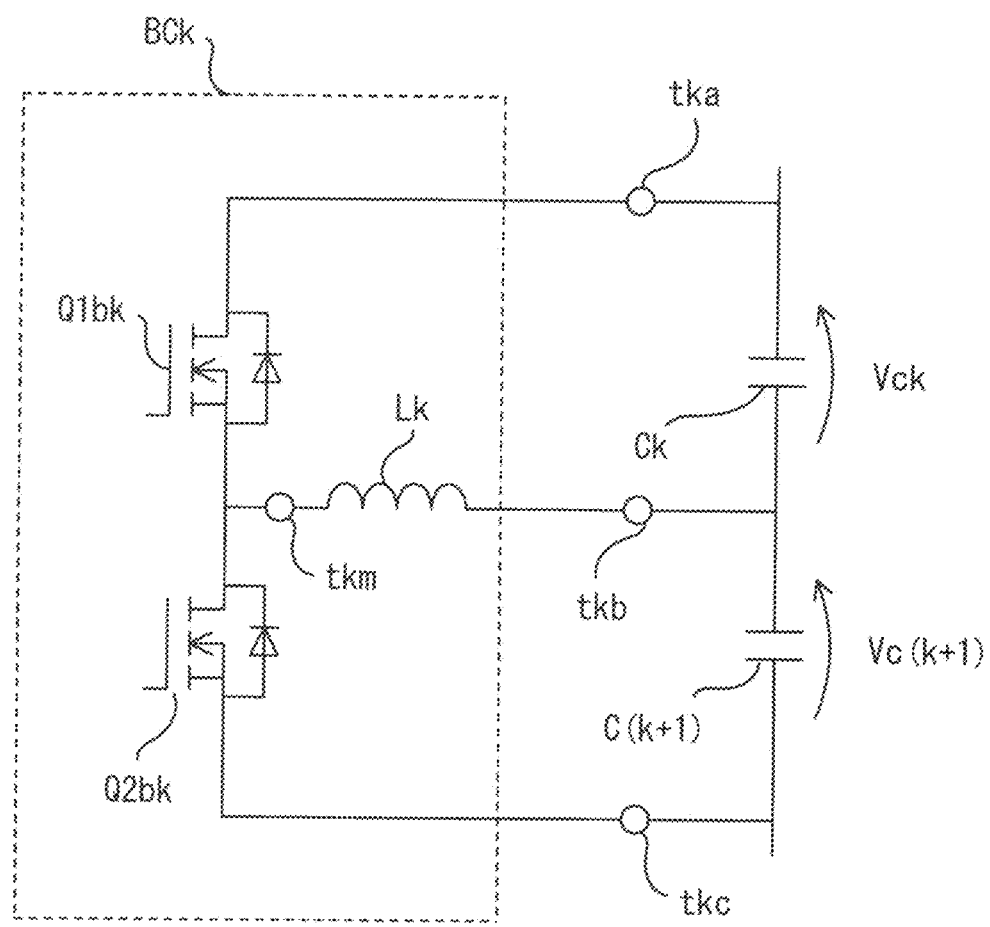
FIG. 7 is a basic configuration diagram of a voltage adjustment circuit in the power conversion device according to embodiment 1.

FIG. 7 is the basic configuration diagram of the voltage adjustment circuit according to embodiment 1.

The voltage adjustment circuit BCk includes voltage adjustment circuit switching elements Q1bk, Q2bk and a voltage adjustment circuit magnetic element Lk.

For simplifying the description, for example, the voltage adjustment circuit switching element Q1bk may be referred to as switching element Q1bk, and the voltage adjustment circuit magnetic element Lk may be referred to as magnetic element Lk.

As the switching elements Q1bk, Q2bk, any self-turn-off semiconductor switching elements such as MOSFET or IGBT may be used. FWDs are connected in antiparallel to the self-turn-off semiconductor switching elements.

The switching element Q1bk and the switching element Q2bk are connected in series and connected to the terminal tka and the terminal tkc, respectively. The magnetic element Lk is connected between a terminal tkb and a terminal (switching element connection terminal) tkm at a connection point between the switching element Q1*bk* and the switching element Q2*bk*.

The switching element connection terminal tkm may be referred to as connection terminal tkm.

Although the detailed operation will be described later, average voltage generated at the connection terminal tkm is determined by voltages of the voltage-division power storage elements Ck and C(k+1) to which the voltage adjustment circuit BCk is connected, and ON/OFF states of the switching elements Q1*bk*, Q2*bk*, and accordingly, power is mutually transferred between the voltage-division power storage element Ck and the voltage-division power storage element C(k+1). Thus, the voltages of the voltage-division power storage element Ck and the voltage-division power storage element C(k+1) can be adjusted.

In this way, the voltage adjustment circuit BCk performs voltage adjustment through mutual transfer of power between the voltage-division power storage elements without using a resistor, whereby loss can be suppressed.

Figure 8:
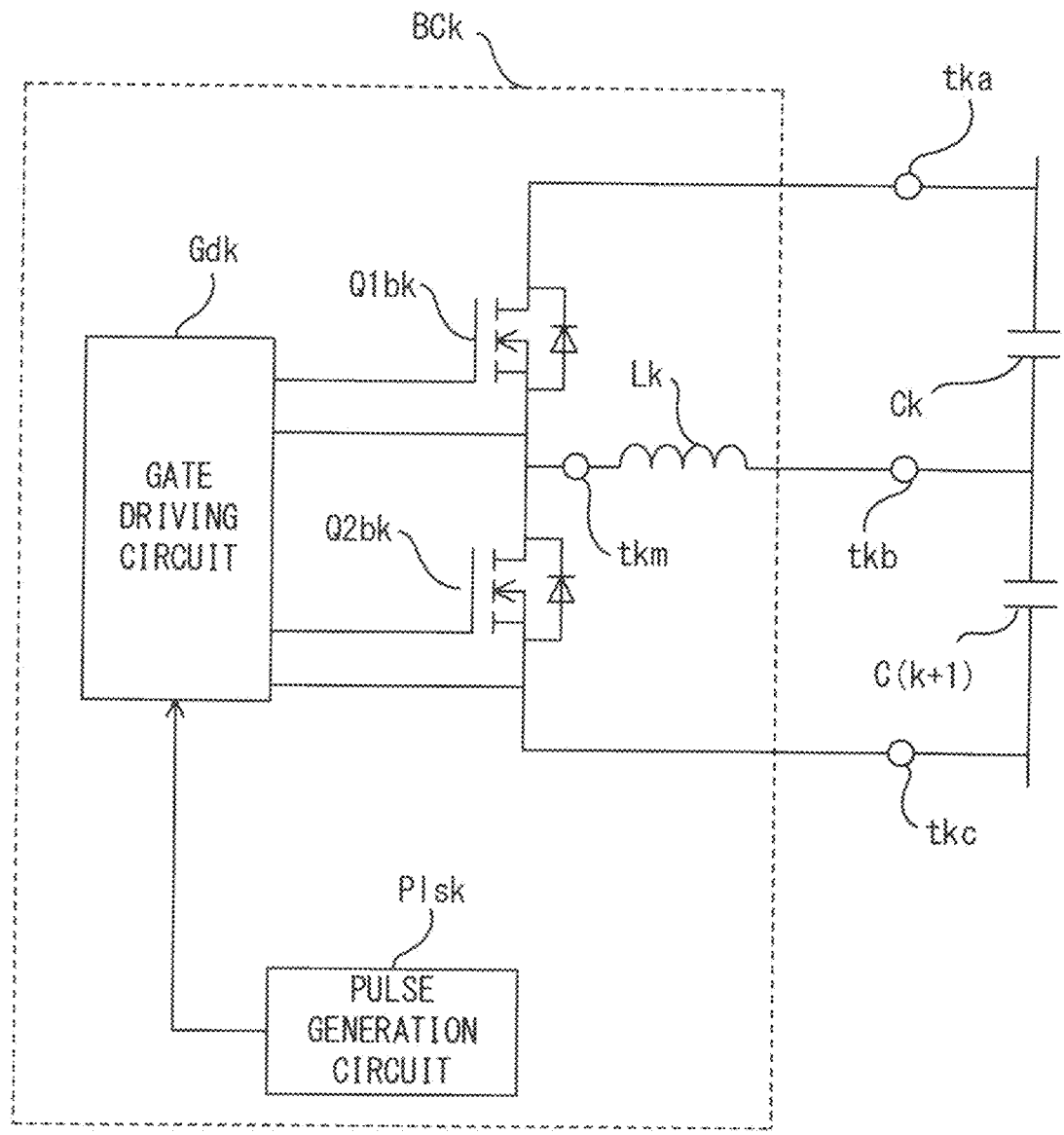
FIG. 8 is a circuit configuration diagram of the voltage adjustment circuit in the power conversion device according to embodiment 1.
Figure 9:
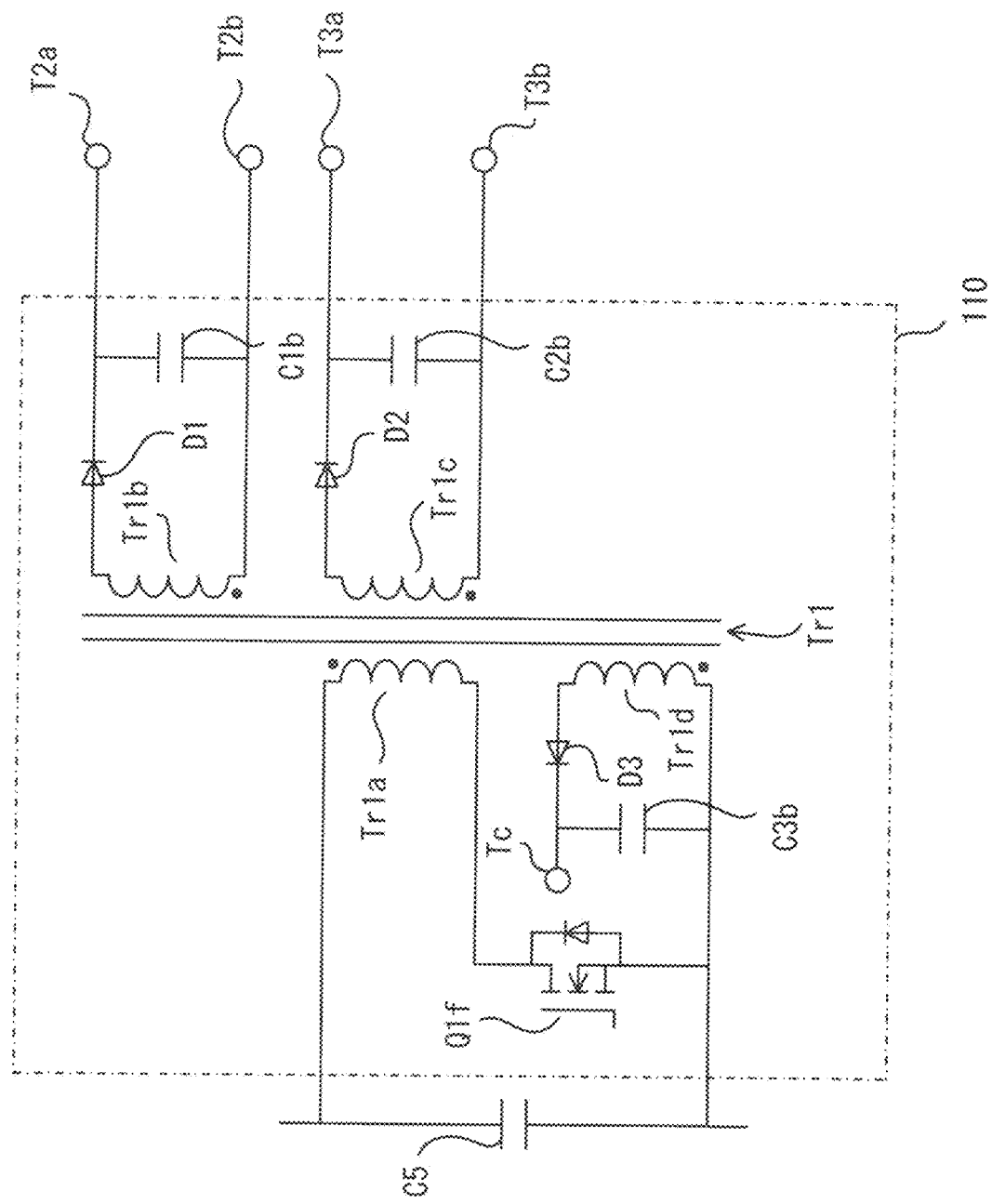
FIG. 9 is a circuit configuration diagram of a DC/DC converter in the power conversion device according to embodiment 1.

FIG. 8 is the configuration diagram of the voltage adjustment circuit BCk according to embodiment 1.

The voltage adjustment circuit BCk includes a voltage adjustment circuit gate driving circuit Gdk and a pulse signal generation circuit Plsk, in addition to the switching elements Q1*bk*, Q2*bk* and the magnetic element Lk described in the basic circuit configuration shown in FIG. 7.

The voltage adjustment circuit gate driving circuit Gdk may be referred to as gate driving circuit Gdk.

The gate driving circuit Gdk drives the switching elements Q1*bk*, Q2*bk* based on a signal from the pulse signal generation circuit Plsk.

The pulse signal generation circuit Plsk generates the signal for driving the switching elements Q1*bk*, Q2*bk* and transmits the signal to the gate driving circuit Gdk.

Next, the detailed operation of the voltage adjustment circuit BCk will be described.

The switching element Q1*bk* and the switching element Q2*bk* are repeatedly turned ON and OFF alternately. Where the voltage of the voltage-division power storage element Ck is denoted by VCk and the voltage of the voltage-division power storage element C(k+1) is denoted by VC(k+1), if the ON periods and the OFF periods of the switching element Q1*bk* and the switching element Q2*bk* are set to be equal, the average potential of the terminal tkm at the connection point between the switching element Q1*bk* and the switching element Q2*bk* as seen from the connection terminal tkc is represented as (VCk+VC(k+1))/2.

Therefore, the voltage adjustment circuit BCk performs mutual transfer of power between the voltage-division power storage element Ck and the voltage-division power storage element C(k+1) connected thereto, so that the voltages of the voltage-division power storage element Ck and the voltage-division power storage element C(k+1) become the average value therebetween.

As a result, the average voltage of the voltage-division power storage element Ck and the voltage-division power storage element C(k+1) always become equal. At this time, such signals as to make the ON periods and the OFF periods equal to each other may be given to the gates of the switching element Q1*bk* and the switching element Q2*bk*.

Accordingly, the pulse signal generation circuit Plsk may generate such pulses as to make the ON periods and the OFF periods equal to each other. Therefore, it is not necessary to perform such control of monitoring voltage and performing feedback. Thus, the circuit can be achieved with a simple configuration without the need of a voltage sensor or the like.

In FIG. 8, one signal is outputted from the pulse signal generation circuit Plsk to the gate driving circuit Gdk. In the gate driving circuit Gdk, gate signals are generated so as to turn the switching element Q1*bk* and the switching element Q2*bk* ON and OFF alternately, based on the ON/OFF signal from the pulse signal generation circuit Plsk.

However, the pulse signal generation circuit Plsk may transmit two signals indicating ON and OFF alternately, to the gate driving circuit Gdk.

It is noted that power for the gate driving circuit Gdk to drive the switching elements Q1*bk*, Q2*bk* is supplied from the DC/DC converter 110 or the voltage-division power storage element Ck through a power converter (not shown).

Next, the configuration and operation of the DC/DC converter 110 will be described with reference to FIG. 9.

The DC/DC converter 110 includes a DC/DC converter transformer Tr1, DC/DC converter diodes D1, D2, D3, a DC/DC converter switching element Q1*f*, and DC/DC converter power storage elements C1*b*, C2*b*, C3*b*.

The DC/DC converter transformer Tr1 includes a transformer primary-side winding Tr1*a*, a transformer secondary-side winding Tr1*b*, a transformer tertiary-side winding Tr1*c*, and a transformer quaternary-side winding Tr1*d*.

For simplifying the description, for example, the DC/DC converter transformer Tr1 may be referred to as transformer Tr1, the DC/DC converter diode D1 may be referred to as diode D1, the DC/DC converter switching element Q1*f* may be referred to as switching element Q1*f*, and the DC/DC converter power storage element C1*b* may be referred to as power storage element C1*b*. In addition, for example, the transformer primary-side winding Tr1*a* may be referred to as primary-side winding Tr1*a*.

The primary-side winding Tr1*a*, the secondary-side winding Tr1*b*, the tertiary-side winding Tr1*c*, and the quaternary-side winding Tr1*d* of the transformer Tr1 are insulated from each other. The switching element Q1*f* is connected in series to the transformer primary-side winding Tr1*a*.

As the switching element Q1*f*, any self-turn-off semiconductor switching element may be used, and an FWD is connected in antiparallel thereto.

The power storage element C1*b* is connected between the power source terminal T2*a* and the power source terminal T2*b*, and the power storage element C2*b* is connected between the power source terminal T3*a* and the power source terminal T3*b*.

The power storage element C3*b* is connected between the DC/DC converter control power source terminal Tc and the lower end of the voltage-division power storage element C5.

The DC/DC converter control power source terminal Tc may be referred to as control power source terminal Tc.

Here, the control power source terminal Tc is a terminal of a power source for driving a control IC for driving and controlling the DC/DC converter 110.

Hereinafter, operation of the DC/DC converter 110 will be described.

During an ON period of the switching element Q1*f*, energy supplied from the voltage-division power storage element C5 is accumulated in the transformer Tr1, and during an OFF period, the energy is transferred as power to the output side.

Through transfer of energy to the power storage elements C1*b* to C3*b*, output voltages are generated and used as control power sources for the main circuit control device 200 and the DC/DC converter 110.

In this configuration, the transformer Tr1 may be configured such that the turns ratios of the windings Tr1a to Tr1d of the transformer Tr1 are adapted to voltages needed as the respective power sources, whereby, even in a case of needing different voltages as the respective power sources, power can be supplied by one DC/DC converter 110 and only one transformer is needed.

In embodiment 1, a case where the DC/DC converter 110 is a flyback converter is shown as an example. However, a known configuration of a DC/DC converter using a transformer, e.g., a forward converter, may be adopted.

In embodiment 1, a one-to-one relationship in which one winding of the transformer Tr1 supplies power to one power source is adopted. However, when the voltages of the respective power sources are equal or when another power converter for changing DC voltage is provided between the DC/DC converter 110 and the main circuit control device 200, power may be supplied from one winding of the transformer Tr1 to each power source.

The diode D1 may be replaced with a semiconductor switching element to which an FWD is connected in antiparallel as appropriate.

In the above configuration, one DC/DC converter 110 is provided to the main circuit power supply device 100. However, a plurality of DC/DC converters may be provided and each may supply necessary power sources.

As described above, the power conversion device according to embodiment 1 includes: a main circuit including a main circuit switching element and a main circuit power storage element; a main circuit control device for controlling the main circuit; and a main circuit power supply device for supplying a control power source from the main circuit power storage element to the main circuit control device, wherein the main circuit power supply device includes a plurality of voltage-division power storage elements connected in series, a voltage adjustment circuit which is connected to the plurality of voltage-division power storage elements and adjusts each of voltages of the plurality of voltage-division power storage elements through mutual transfer of power between the plurality of voltage-division power storage elements, and at least one DC/DC converter which is connected to at least one of the plurality of voltage-division power storage elements and supplies the control power source.

Thus, the power conversion device of embodiment 1 enables size reduction of the main circuit power supply device and enables reduction in loss.

Embodiment 2

A power conversion device according to embodiment 2 is configured such that a common pulse signal generation circuit for generating ON/OFF signals for driving the voltage adjustment circuit switching elements of each voltage adjustment circuit is provided in the main circuit power supply device.

The power conversion device of embodiment 2 will be described, focusing on difference from embodiment 1, with reference to FIG. 10 which is a circuit configuration diagram of the voltage adjustment circuit.

In the configuration diagram in embodiment 2, parts that are the same as or correspond to those in embodiment 1 are denoted by the same reference characters.

In embodiment 1, the voltage adjustment circuits BC1 to BC4 are respectively provided with the pulse signal generation circuits Pls1 to Pls4. Each pulse signal generation circuit Plsk generates pulses so that the ON periods and the OFF periods become equal, and transmits the signal to the gate driving circuit Gdk, and the switching elements Q1bk, Q2bk are driven based on the signal.

When the pulse signal generation circuits Pls1 to Pls4 send signals in the same phase, operation is performed such that, with respect to the voltage-division power storage element Ck, when the voltage adjustment circuit switching element Q1bk is ON, the switching element Q2b(k−1) is OFF, and when the switching element Q1bk is OFF, the switching element Q2b(k−1) is ON. Therefore, in one switching cycle, excessive power supply to the voltage-division power storage element Ck does not occur and ripple is constant.

However, when the pulse signal generation circuits Pls1 to Pls4 send different signals, with respect to the voltage-division power storage element Ck, a state in which the switching element Q2b(k−1) is also ON when the switching element Q1bk is ON, or they are both OFF at the same time, can occur.

In this case, the voltage-division power storage element Ck is excessively discharged or charged, so that ripple increases. When great ripple occurs, there is a possibility that stability of control of the DC/DC converter 110 is deteriorated or overvoltage is detected from the ripple.

The power conversion device of embodiment 2 addresses such a problem.

Figure 10:
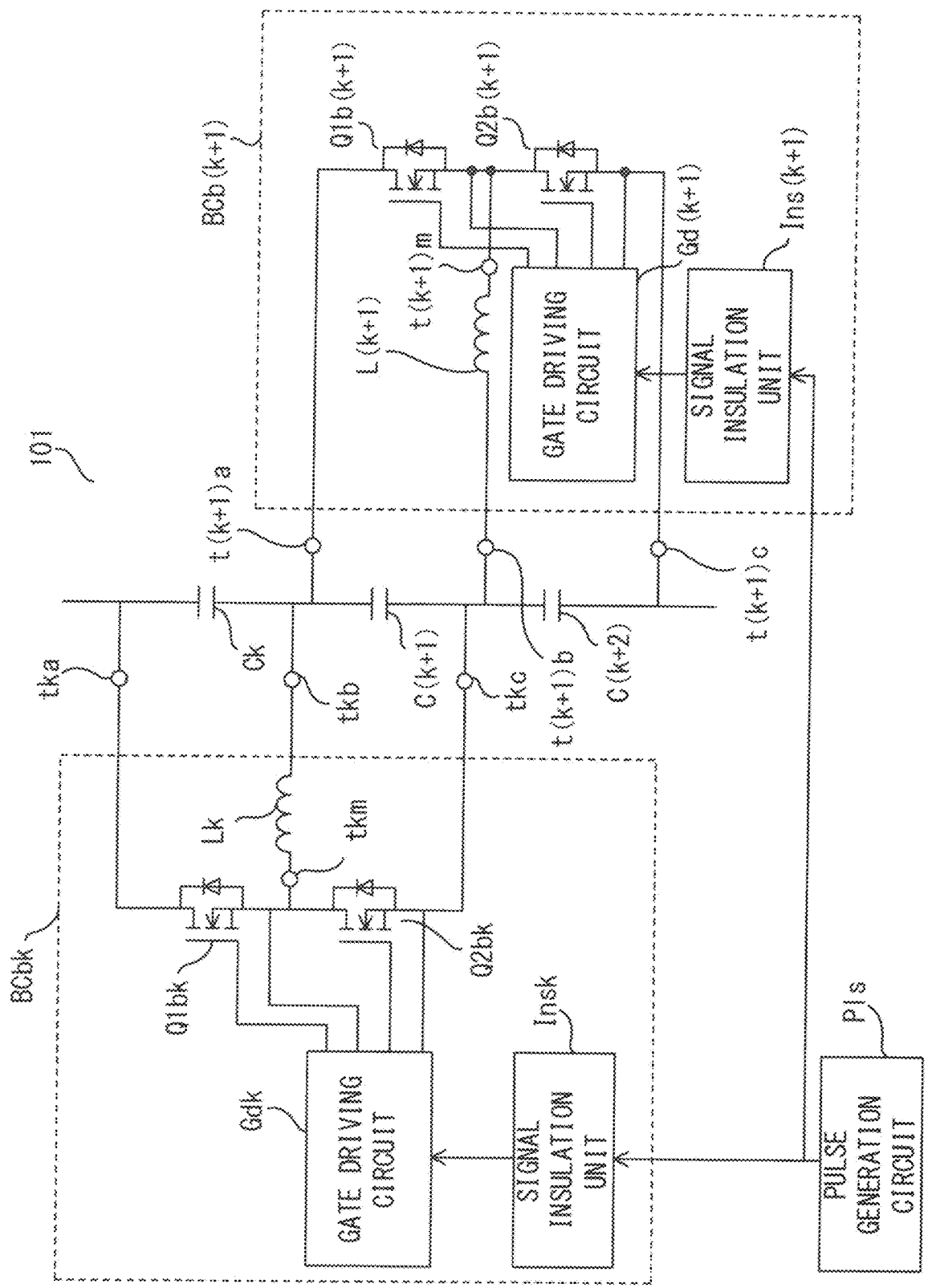
FIG. 10 is a circuit configuration diagram of a voltage adjustment circuit in a power conversion device according to embodiment 2.

FIG. 10 is the configuration diagram of the voltage adjustment circuit BCbk in embodiment 2.

Hereinafter, the configurations of the voltage adjustment circuit BCbk and the main circuit power supply device 101 in embodiment 2 will be described.

For discrimination from embodiment 1, the voltage adjustment circuit is denoted by BCbk and the main circuit power supply device is denoted by 101.

The voltage adjustment circuit BCbk in embodiment 2 includes the gate driving circuit Gdk for driving the switching elements Q1bk, Q2bk, and a signal insulation unit Insk. The signal insulation unit Insk transmits a signal from the outside of the voltage adjustment circuit BCbk, in an electrically insulated state, to the gate driving circuit Gdk. That is, an ON/OFF signal for the switching elements Q1bk, Q2bk is transmitted to the voltage adjustment circuit BCbk via the signal insulation unit Insk.

In embodiment 1, each voltage adjustment circuit BCk is provided with the pulse signal generation circuit Plsk, but in embodiment 2, the voltage adjustment circuit BCbk is not provided with the pulse signal generation circuit Plsk.

In embodiment 2, only one pulse signal generation circuit Pls is provided in the main circuit power supply device 101.

However, one voltage adjustment circuit BCbk may have the pulse signal generation circuit Pls. For example, the voltage adjustment circuit BC4 may have the pulse signal generation circuit Pls.

The pulse signal generation circuit Pls transmits its output to the signal insulation units Ins1, Ins2, Ins3, Ins4 provided to the respective voltage adjustment circuits BCb1, BCb2, BCb3, BCb4. Because the ON/OFF signals can be transmitted to the respective voltage adjustment circuits BCb1 to BCb4 by one pulse signal generation circuit Pls, it is possible to transmit pulse signals synchronized with each other and having ON periods and OFF periods equal to each other.

Thus, voltage ripples at the voltage-division power storage elements C1 to C5 and current ripple at each magnetic element Lk can be suppressed.

The signal insulation unit Insk may be an optical transmission circuit composed of an optical fiber and an optical transmission/reception element such as a photocoupler, a digital isolator which transmits a signal through an AC coupling element, or the like. The digital isolator includes a coupler of a magnetic coupling type or a coupler of a capacitance coupling type.

As described above, the power conversion device according to embodiment 2 is configured such that a common pulse signal generation circuit for generating ON/OFF signals for driving the voltage adjustment circuit switching elements of each voltage adjustment circuit is provided in the main circuit power supply device.

Thus, the power conversion device of embodiment 2 enables size reduction of the main circuit power supply device and enables reduction in loss. Further, voltage ripples at the voltage-division power storage elements and current ripple at the magnetic element Lk can be suppressed.

Embodiment 3

A power conversion device according to embodiment 3 is configured such that input voltage to the DC/DC converter is constant, thereby making it easy to design the DC/DC converter.

The power conversion device of embodiment 3 will be described, focusing on difference from embodiment 1, with reference to FIG. 11 which is a circuit configuration diagram of a voltage adjustment circuit. Reference will be made to the drawings used in embodiment 1, as necessary.

In the configuration diagram of embodiment 3, parts that are the same as or correspond to those in embodiment 1 are denoted by the same reference characters.

In embodiment 1, the voltage of the main circuit power storage element CM is equalized among all the voltage adjustment circuits BC1 to BC4. Therefore, when the voltage of the main circuit power storage element CM changes, the voltage of each voltage-division power storage element Ck also changes accordingly.

Operation of the DC/DC converter 110 of embodiment 1 can be classified into two modes. These modes are referred to as continuous current mode and discontinuous current mode.

In the continuous current mode, the switching element Q1$f$ is switched from OFF to ON in a state in which energy is accumulated in the transformer Tr1. At the moment when the switching element Q1$f$ is switched from OFF to ON, current flows through the switching element Q1$f$ and thus switching loss of the switching element Q1$f$ increases.

In the discontinuous current mode, when the switching element Q1$f$ is OFF, energy of the transformer Tr1 is all transferred to the output side, and in a state in which energy accumulated in the transformer Tr1 is zero, the switching element Q1$f$ is switched from OFF to ON. Current flowing through the switching element Q1$f$ at the moment when the switching element Q1$f$ is switched from OFF to ON is zero and therefore switching loss of the switching element Q1$f$ is small. However, it is necessary to increase the peak value of current for accumulating energy, and therefore the size of the transformer Tr1 is likely to increase.

The continuous current mode and the discontinuous current mode both can be determined by designing the excitation inductance of the transformer Tr1 and the switching frequency of the switching element Q1$f$ based on the specifications of input voltage, output voltage, and output power. That is, the operation mode in a steady operation is determined in accordance with a purpose such as loss reduction or size reduction, and the switching frequency and the excitation inductance are designed accordingly.

However, when any of the input voltage, the output voltage, and the output power greatly changes in a steady operation, it is necessary to determine the operation mode considering the range of the change. This can make it difficult to design the DC/DC converter.

That is, in embodiment 1, the voltage of each voltage-division power storage element Ck changes, and therefore the voltage VC5 of C5 which is the input voltage of the DC/DC converter 110 also changes. Thus, it might become difficult to design the DC/DC converter 110.

The power conversion device of embodiment 3 addresses such a problem.

Figure 11:
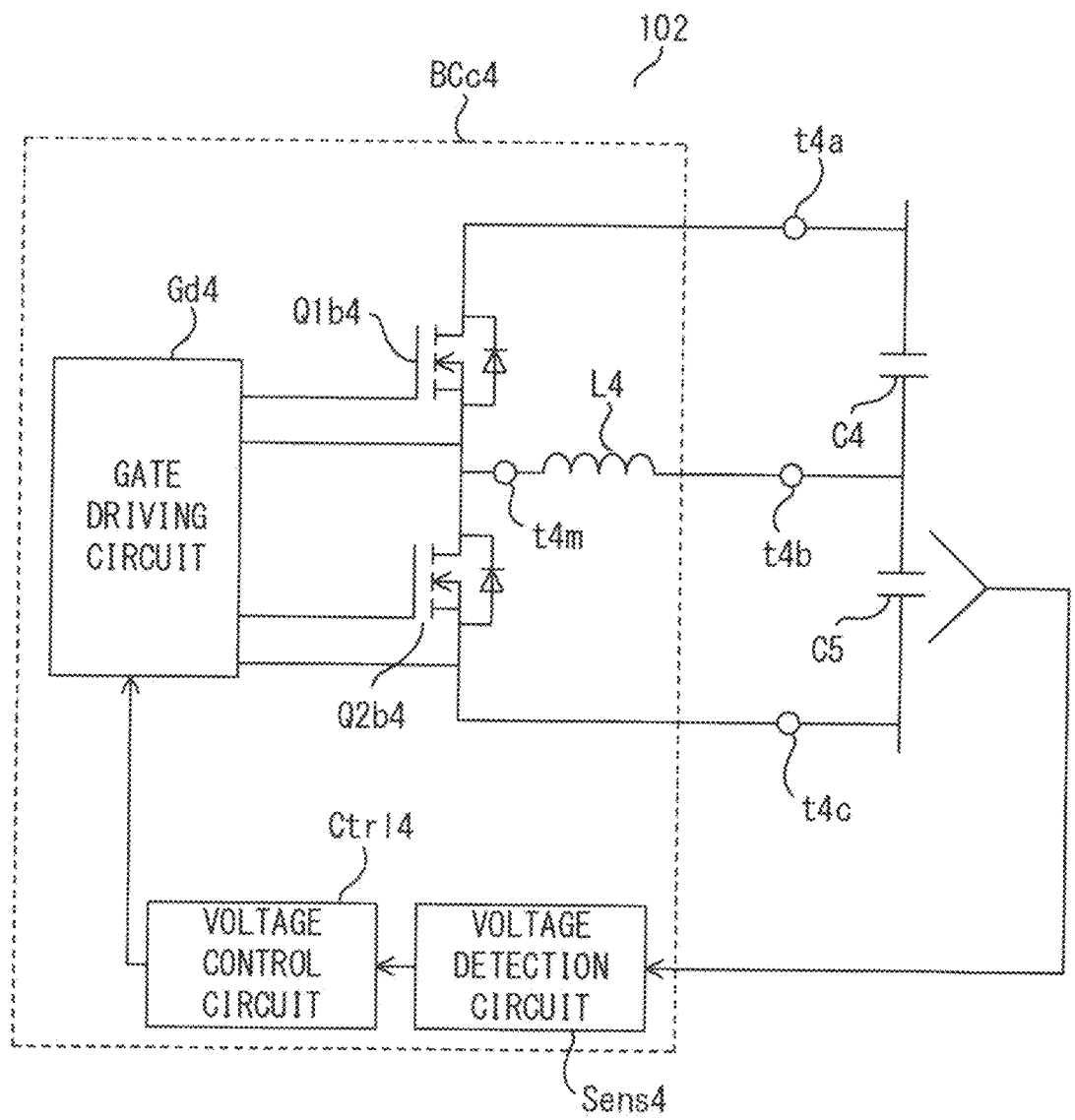
FIG. 11 is a circuit configuration diagram of a voltage adjustment circuit in a power conversion device according to embodiment 3.

FIG. 11 is the configuration diagram of a voltage adjustment circuit BCc4 in embodiment 3.

Hereinafter, the configurations of the voltage adjustment circuit BCc4 and a main circuit power supply device 102 in embodiment 3 will be described.

For discrimination from embodiment 1, the voltage adjustment circuit is denoted by BCc4 and the main circuit power supply device is denoted by 102.

The voltage adjustment circuit BCc4 in embodiment 3 includes the voltage adjustment circuit gate driving circuit Gd4 for driving the switching elements Q1$b$4, Q2$b$4, a voltage detection circuit Sens4, and a voltage control circuit Ctrl4. Further, the voltage adjustment circuit BCc4 includes the magnetic element L4.

The voltage adjustment circuit gate driving circuit Gd4 may be referred to as gate driving circuit Gd4.

The voltage detection circuit Sens4 detects the voltage of the voltage-division power storage element C5. The voltage control circuit Ctrl4 changes a switching pattern based on the detected voltage value.

The voltage control circuit Ctrl4 for changing a switching pattern can be achieved by at least one of software processing or hardware processing. For the other voltage adjustment circuits BCc1 to BCc3, signals are given so that the ON periods and the OFF periods of the switching element Q1$bk$ and the switching element Q2$bk$ become equal to each other as in embodiment 1.

Next, operation of the main circuit power supply device 102, including the voltage adjustment circuit BCc4, will be described.

The voltage detection circuit Sens4 detects the voltage VC5 of the voltage-division power storage element C5. Based on the detected voltage VC5 of the voltage-division power storage element C5, the voltage control circuit Ctrl4 outputs a signal having a switching pattern for gate driving to the gate driving circuit Gd4. The gate driving circuit Gd4 controls the switching elements Q1$b$4, Q2$b$4 so as to make the voltage VC5 of the voltage-division power storage element C5 constant.

At this time, for the voltages VC1 to VC4 of the other voltage-division power storage elements C1 to C4, the voltage adjustment circuits BCc1 to BCc3 in which the ratios of the ON period and the OFF period are equal, are connected.

Therefore, the voltages VC1 to VC4 of the voltage-division power storage elements C1 to C4 are represented by VCk=(ΣVCk−VC5)/4.

Here, ΣVCk is the sum of voltages of the voltage-division power storage elements C1 to C5.

Thus, while the voltage value of the voltage-division power storage element C5 is made constant, the voltages of the other voltage-division power storage elements C1 to C4 are uniformed, and thus operation can be performed stably without causing overvoltage.

In addition, because the voltage value of the voltage-division power storage element C5 is constant, designing the DC/DC converter 110 becomes easy.

As described above, the power conversion device according to embodiment 3 is configured such that the input voltage of the DC/DC converter is constant, thereby making it easy to design the DC/DC converter.

Thus, the power conversion device of embodiment 3 enables size reduction of the main circuit power supply device and enables reduction in loss. Further, designing of the DC/DC converter can be made easy.

Embodiment 4

A power conversion device according to embodiment 4 is configured such that a protection circuit for preventing overvoltage is provided to the voltage adjustment circuit.

The power conversion device of embodiment 4 will be described, focusing on difference from embodiment 1, with reference to FIG. 12 which is a configuration diagram of the main circuit power supply device and FIG. 13 which is a configuration diagram showing an example of the protection circuit of the voltage adjustment circuit.

In the configuration diagrams of embodiment 4, parts that are the same as or correspond to those in embodiment 1 are denoted by the same reference characters.

In embodiment 1, the voltage adjustment circuits BC1 to BC4 adjust voltages of all the voltage-division power storage elements C1 to C5. However, when it becomes impossible to perform voltage adjustment by the voltage adjustment circuits BC1 to BC4 due to failure in any of the voltage adjustment circuits BCk, disturbance, or the like, overvoltage occurs at any of the voltage-division power storage elements Ck, so that the withstand voltage of the voltage-division power storage element Ck or the switching element included in the voltage adjustment circuit BCk might be exceeded.

Embodiment 4 addresses such a problem.

Figure 12:
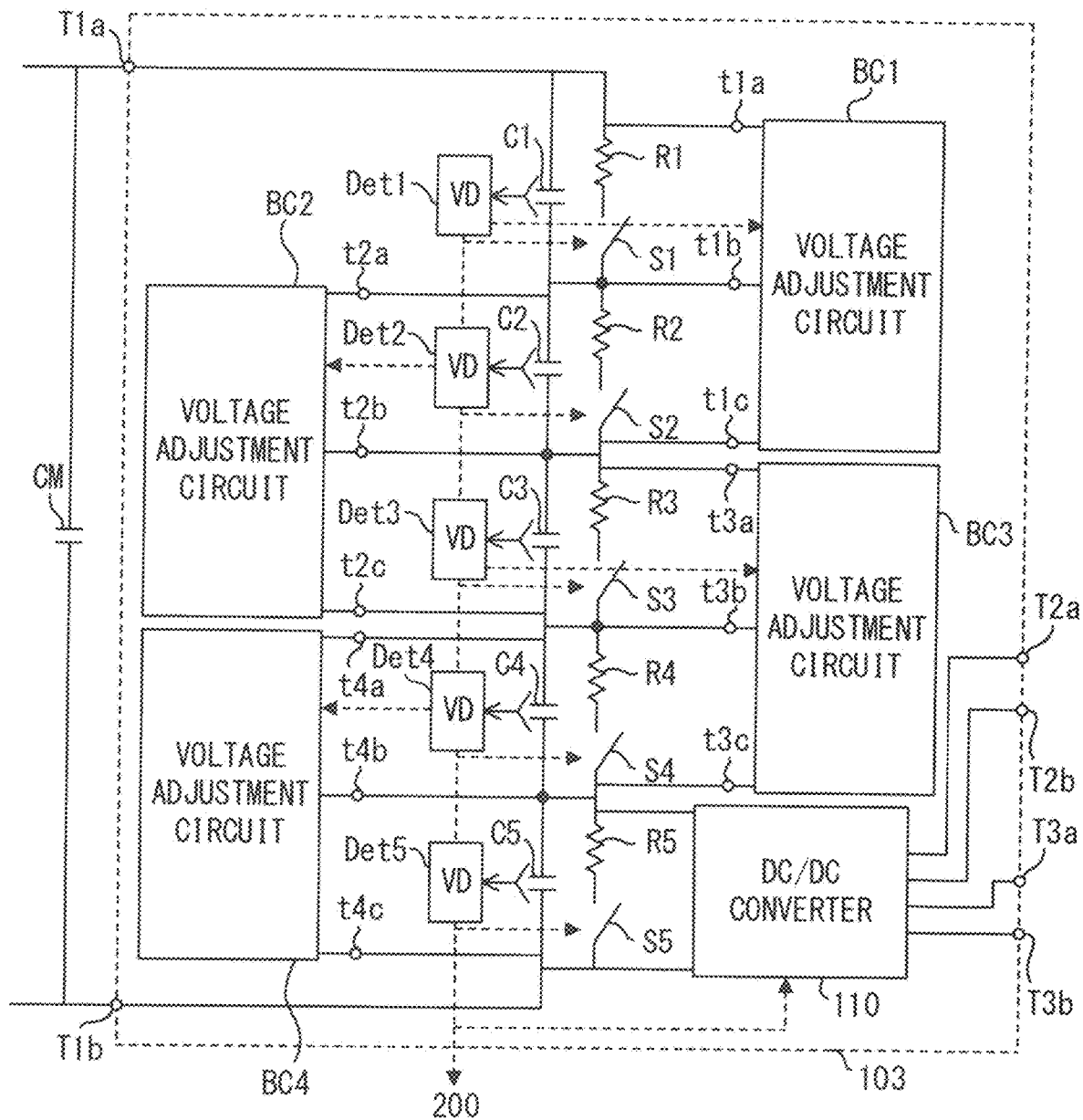
FIG. 12 is a circuit configuration diagram of a main circuit power supply device in a power conversion device according to embodiment 4.

FIG. 12 is the configuration diagram of a main circuit power supply device 103 in embodiment 4.

Hereinafter, the configuration of the main circuit power supply device 103 in embodiment 4 will be described.

For discrimination from embodiment 1, the main circuit power supply device is denoted by 103.

The main circuit power supply device 103 in embodiment 4 includes protection circuit switches S1, S2, S3, S4, S5 and protection circuit resistors R1, R2, R3, R4, R5, in addition to the configuration of the main circuit power supply device 100 in embodiment 1. Further, the main circuit power supply device 103 includes overvoltage detection circuits Det1, Det2, Det3, Det4, Det5.

For simplifying the description, for example, the protection circuit switch S1 may be referred to as switch S1 and the protection circuit resistor R1 may be referred to as resistor R1.

The switch Sk and the resistor Rk are connected in series and connected in parallel to the voltage-division power storage element Ck. Further, the overvoltage detection circuit Detk detects overvoltage of the voltage-division power storage element Ck. In FIG. 12, the overvoltage detection circuit is described as VD.

As the switch Sk, a semiconductor element such as IGBT or MOSFET, or a mechanical switch such as a relay, may be used.

The switches Sk are all turned on when the main circuit control device 200 is not operating. In addition, the switches Sk are turned on also when the voltage of one of the voltage-division power storage elements C1 to C5 has become overvoltage during operation of the main circuit control device 200. At this time, operations of all the voltage adjustment circuits BC1 to BC5 and the DC/DC converter 110 are stopped.

By stopping operations of all the voltage adjustment circuits BCk and the DC/DC converter 110, it is possible to prevent overvoltage that exceeds the withstand voltages of the voltage-division power storage elements C1 to C5.

Here, the overvoltage refers to a state in which the voltage of the voltage-division power storage element Ck becomes not less than 0.25 times the withstand voltage of the switching elements Q1bk, Q2bk.

This is based on the fact that the maximum value of surge voltage arising at the switching elements Q1bk, Q2bk is two times the voltage applied to the switching elements Q1bk, Q2bk when surge voltage is not considered. That is, voltage normally applied to the switching elements Q1bk, Q2bk is the sum of voltages of the voltage-division power storage elements Ck and C(k+1), and therefore, in a case of including surge voltage, overvoltage might occur when the voltage of the voltage-division power storage element Ck has become not less than 0.25 times the withstand voltage of the switching elements Q1bk, Q2bk.

Thus, a state in which the voltage of the voltage-division power storage element Ck has become not less than 0.25 times the withstand voltage of the switching elements Q1bk, Q2bk is regarded as overvoltage.

The above case corresponds to a case where one voltage adjustment circuit is connected to two voltage-division power storage elements, i.e., the number of the voltage-division power storage elements is two, and thus the calculation results in 1/4=0.25.

To generalize this, when the voltage value has become a product of the withstand voltage of the switching elements Q1bk, Q2bk and (1/(2×number of connected voltage-division power storage elements)), overvoltage might occur.

Here, (1/(2×number of connected voltage-division power storage elements) is the reciprocal of two times the number of the connected voltage-division power storage elements.

Hereinafter, the detailed operation will be described.

First, a case where the switch Sk is a normally-on switch will be described.

In the case where the switch Sk is a normally-on switch, when the main circuit control device 200 is not operating, a signal is not sent and thus the switch Sk is ON.

When the main circuit control device 200 is operating, the switch Sk is turned off by being supplied with power from the main circuit power supply device 103. In addition, when voltage of one of the voltage-division power storage elements C1 to C5 has become overvoltage, operations of all the voltage adjustment circuits BC1 to BC4 and the DC/DC converter 110 are stopped. When operations of the voltage adjustment circuits BC1 to BC4 and the DC/DC converter 110 are stopped, power supply from the main circuit power supply device 103 is lost, so that the switch Sk is automatically turned on.

Next, a case where the switch Sk is a normally-off switch will be described.

When the switch Sk is a normally-off switch, power needs to be supplied for turning on the switch Sk.

Figure 13:
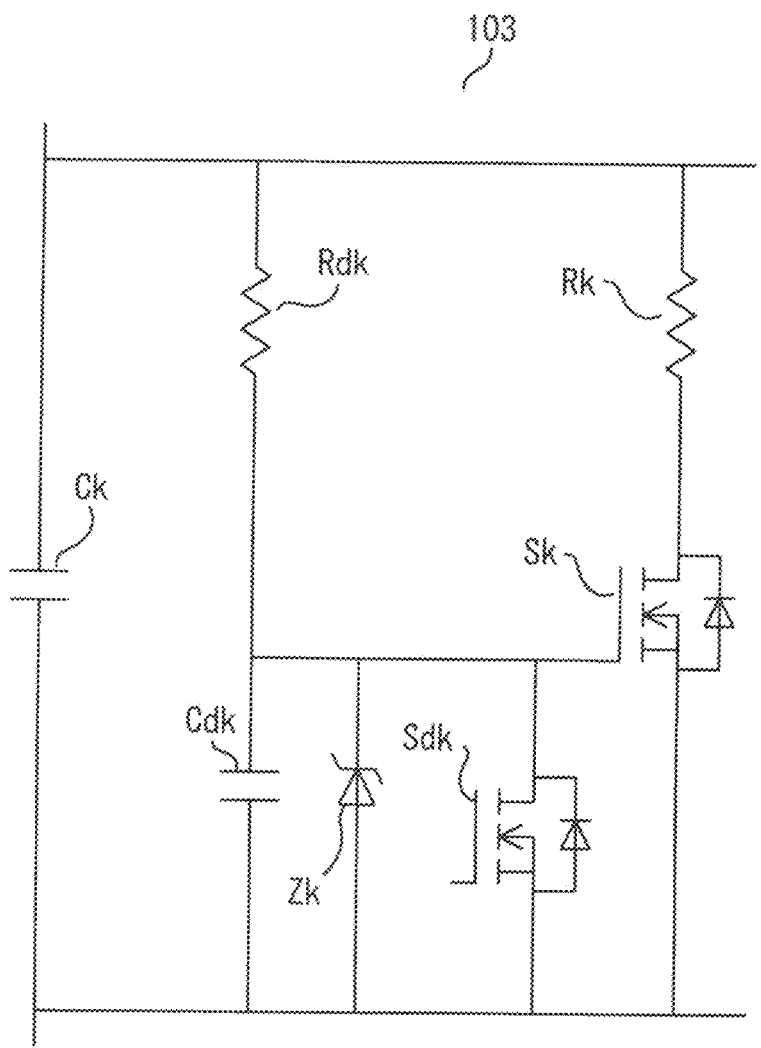
FIG. 13 is a configuration diagram showing an example of a protection circuit in the power conversion device according to embodiment 4.

FIG. 13 shows an example of the protection circuit that can realize achieved operation, in the case of using the normally-off switch.

In this case, the main circuit power supply device 103 further includes a normally-off protection circuit switch Sdk, a protection circuit resistor Rdk, a protection circuit zener diode Zk, and a protection circuit power storage element Cdk, in addition to the switch Sk and the resistor Rk.

For simplifying the description, the protection circuit switch Sdk may be referred to as switch Sdk, the protection circuit resistor Rdk may be referred to as resistor Rdk, and the protection circuit zener diode Zk may be referred to as zener diode Zk.

The switches Sk and Sdk in FIG. 13 are shown as MOSFETs, as a typical example. However, they may be other normally-off switches such as IGBT or a mechanical switch.

The resistance value of the resistor Rdk is much greater than the resistance value of the resistor Rk. The switch Sdk is driven by a gate driving unit (not shown), and power for driving the gate driving unit is supplied from the DC/DC converter 110 or the voltage-division power storage element Ck via a power converter (not shown).

Here, the gate driving voltage for the switch Sk is lower than the breakdown voltage of the zener diode Zk. A gate signal for the switch Sdk is driven from the main circuit control device 200 or a control device (not shown).

First, when the voltage of the main circuit power storage element CM is 0 V or voltage applied to each voltage-division power storage element Ck is lower than the breakdown voltage of the zener diode Zk, the gate voltage of the switch Sk is 0 V. Therefore, the switch Sk is OFF.

Next, when voltage applied to the voltage-division power storage element Ck is greater than the breakdown voltage of the zener diode Zk and is lower than the operating range of the DC/DC converter 110, the DC/DC converter 110 does not operate. Thus, power supplied to the switch Sdk is zero.

At this time, because the gate driving voltage for the switch Sk is smaller than the breakdown voltage of the zener diode Zk, the switch Sk is turned on with the breakdown voltage of the zener diode applied to the switch Sk.

Thus, the protection circuit switches S1 to S5 are turned on, and the voltages of the voltage-division power storage elements C1 to C5 are balanced by the protection circuit resistors R1 to R5.

Next, when the main circuit power supply device 103, including the DC/DC converter 110, is operating normally, an ON signal is sent from the main circuit control device 200 to the switch Sdk. Because power is supplied to the switch Sdk from the DC/DC converter 110, the switch Sdk can be driven and thus the switch Sdk is turned on.

At this time, the electric charge of the protection circuit power storage element Cdk is taken out, so that the gate voltage of the switch Sk is lowered to about 0 V and thus the switch Sk is turned off.

Therefore, when the main circuit power supply device 103 is operating normally, current does not flow through the resistor Rk and current flows through only the resistor Rdk having a high resistance, so that steady loss due to resistors can be suppressed.

When the voltage of any of the voltage-division power storage elements C1 to C5 has become overvoltage, all the voltage adjustment circuits BC1 to BC4 and the DC/DC converter 110 are stopped.

When the overvoltage detection circuit Det1 to Det5 has detected the overvoltage, OFF signals are sent to the switches Sd1 to Sd5 from the main circuit control device 200 or another control device (not shown).

In an initial period just after the voltage adjustment circuits BC1 to BC4 and the DC/DC converter 110 are stopped, power is not lost immediately, because of the power storage elements included in the main circuit control device 200 or the DC/DC converter 110.

Therefore, it is necessary to turn off the switch Sdk by a control signal. When the switch Sdk is turned off, the switch Sk is turned on, so that the voltages of the voltage-division power storage elements C1 to C5 become equal.

As time passes, the electric charges in the power storage elements of the main circuit control device 200 or the DC/DC converter 110 are lost. At this time, the driving power for the switch Sdk is also lost, so that the switch Sdk is kept in an OFF state, and the switch Sk is ON as long as voltage is applied to the voltage-division power storage element Ck. Thus, the voltages of the voltage-division power storage elements C1 to C5 are balanced.

As described above, also for the normally-off switch Sk, if voltages are applied to the voltage-division power storage elements C1 to C5, each switch Sk is OFF during normal operation and is turned on when operation is not being performed or overvoltage has occurred.

Thus, in any case, imbalance of the voltages of the voltage-division power storage elements C1 to C5 can be prevented and steady loss can be reduced to the minimum level.

As described above, for overvoltage of the voltage-division power storage element Ck, either of the normally-on switch Sk and the normally-off switch Sk can be applied.

As described above, the power conversion device according to embodiment 4 is configured such that a protection circuit for preventing overvoltage is provided to the voltage adjustment circuit.

Thus, the power conversion device of embodiment 4 enables size reduction of the main circuit power supply device and enables reduction in loss. Further, even if overvoltage occurs at the voltage-division power storage element, the switching elements in the voltage adjustment circuits can be protected.

In embodiments 1 to 4, the voltage-division power storage elements C1 to C5, the DC/DC converter power storage elements C1$b$ to C3$b$, the protection circuit power storage elements Cd1 to Cd5, and the main circuit power storage element CM may be made of various types of capacitors such as an electrolytic capacitor, a film capacitor, a ceramic capacitor, or an electrical double layer capacitor. Alternatively, secondary batteries may be used.

In embodiments 1 to 4, an inductor may be used as the voltage adjustment circuit magnetic element Lk. In this case, the core material of the inductor is not limited.

In embodiments 1 to 4, the main circuit power supply device includes only one DC/DC converter. However, the main circuit power supply device may include two or more DC/DC converters.

However, to decrease the number of transformers, the number of DC/DC converters needs to be smaller than the number of the voltage-division capacitors.

In embodiments 1 to 4, the main circuit power supply device includes a plurality of voltage adjustment circuits. However, the main circuit power supply device may include only one voltage adjustment circuit.

For example, the main circuit power supply device may include two voltage-division power storage elements and one voltage adjustment circuit connected to the two voltage-division power storage elements. In this case, the DC/DC converter is connected to one of the two voltage-division power storage elements.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

INDUSTRIAL APPLICABILITY

The present disclosure enables size reduction of a main circuit power supply device and enables reduction in loss, and therefore is applicable to a wide variety of power conversion devices.

DESCRIPTION OF THE REFERENCE CHARACTERS 1 power conversion device
100, 100A, 100B, 100C, 101 to 103 main circuit power supply device
110 DC/DC converter
200 main circuit control device
210 gate driving circuit
220 control signal generation circuit
300 main circuit
Q1 to Q4 main circuit switching element
CM main circuit power storage element
C1 to C5, Ck voltage-division power storage element
BC1 to BC4, BCa1 to BCa3, BCk, BCbk, BCc4 voltage adjustment circuit
C1$b$, C2$b$, C3$b$ DC/DC converter power storage element
Ctrl4 voltage control circuit
Det1 to Det5 overvoltage detection circuit
Gd4 voltage adjustment circuit gate driving circuit
Insk signal insulation unit
Lk voltage adjustment circuit magnetic element
Pls, Plsk pulse signal generation circuit
Q1$f$ DC/DC converter switching element
Q1$bk$, Q2$bk$ voltage adjustment circuit switching element
tka to tkd voltage adjustment circuit terminal
tkm switching element connection terminal
T1$a$, T1$b$ main circuit power supply device input terminal
T2$a$, T2$b$ control signal generation circuit power source terminal
T3$a$, T3$b$ gate driving circuit power source terminal
TCa, TCb main circuit terminal
Tc DC/DC converter control power source terminal
S1 to S5 protection circuit switch
R1 to R5 protection circuit resistor
Rdk protection circuit resistor
Cdk protection circuit power storage element
Sdk protection circuit switch
Sens4 voltage detection circuit
Zk protection circuit zener diode
D1 to D3 DC/DC converter diode
In DC/DC converter transformer
Tr1$a$ transformer primary-side winding
Tr1$b$ transformer secondary-side winding
Tr1$c$ transformer tertiary-side winding
Tr1$d$ transformer quaternary-side winding

The invention claimed is:

1. A power conversion device comprising:
a main circuit including a main circuit switching element and a main circuit power storage element;
main circuit control circuitry to control the main circuit; and
a main circuit power supply device to supply a control power source from the main circuit power storage element to the main circuit control circuitry, wherein
the main circuit power supply device includes
a plurality of voltage-division power storage elements connected in series,
a voltage adjustment circuit which is connected to the plurality of voltage-division power storage elements and adjusts each of voltages of the plurality of voltage-division power storage elements through mutual transfer of power between the plurality of voltage-division power storage elements, and
at least one DC/DC converter which is connected to at least one of the plurality of voltage-division power storage elements and supplies the control power source.

2. The power conversion device according to claim 1, wherein
the main circuit power supply device includes three or more of the voltage-division power storage elements connected in series, and a plurality of the voltage adjustment circuits,
each voltage adjustment circuit is connected to a set of at least two voltage-division power storage elements among the three or more voltage-division power storage elements, and
a part of the set of the voltage-division power storage elements to which the voltage adjustment circuit is connected and a part of the at least two voltage-division power storage elements to which another one of the voltage adjustment circuits is connected, overlap each other.

3. The power conversion device according to claim 1, wherein
the main circuit power supply device includes N number of the voltage-division power storage elements connected in series, and the voltage adjustment circuits whose number is not less than 2 and not greater than (N−1), N being an integer not less than 3,
the N number of voltage-division power storage elements connected in series are connected in parallel to the main circuit power storage element,
a set of the voltage-division power storage elements is composed of n number of the voltage-division power storage elements, n being an integer in a range of 2≤n≤(N−1), and
a kth one of the voltage adjustment circuits from a positive side of the main circuit power storage element is connected to the set of voltage-division power storage elements composed of kth to (k+n−1)th ones of the voltage-division power storage elements from the positive side of the main circuit power storage element, k being an integer in a range of 1≤k≤(N−1).

4. The power conversion device according to claim 1, wherein
the voltage adjustment circuit includes at least two voltage adjustment switching elements and at least one magnetic element.

5. The power conversion device according to claim 4, wherein
in all the voltage adjustment circuits, ON periods and OFF periods of the voltage adjustment switching elements are set to be equal.

6. The power conversion device according to claim 5, wherein
each voltage adjustment circuit includes at least one signal insulation unit, and ON/OFF signals for the voltage adjustment switching elements generated outside the voltage adjustment circuit are sent to the voltage adjustment circuit via the signal insulation unit.

7. The power conversion device according to claim 1, wherein
at least one of the voltage adjustment circuits includes a voltage detection circuit for detecting voltage of at least one of the voltage-division power storage elements, and includes a circuit for controlling the voltage of the voltage-division power storage element to be a constant value, based on a voltage value obtained by the voltage detection circuit.

8. The power conversion device according to claim 4, wherein
at least one of the voltage adjustment circuits includes a voltage detection circuit for detecting voltage of at least one of the voltage-division power storage elements, and includes a circuit for controlling the voltage of the voltage-division power storage element to be a constant value, on the basis of a voltage value obtained by the voltage detection circuit.

9. The power conversion device according to claim 8, wherein
all the voltage adjustment circuits other than the voltage adjustment circuit that includes the voltage detection circuit for detecting the voltage of the voltage-division power storage element each include the at least two voltage adjustment switching elements, and ON periods and OFF periods of the voltage adjustment switching elements of said other voltage adjustment circuits are set to be equal.

10. The power conversion device according to claim 1, wherein
the DC/DC converter includes at least one transformer.

11. The power conversion device according to claim 10, wherein
the transformer is a multi-winding transformer having three or more windings.

12. The power conversion device according to claim 1, wherein
the main circuit power supply device includes, in parallel to each of the voltage-division power storage elements, a protection circuit switch and a protection circuit resistor connected in series.

13. The power conversion device according to claim 12, wherein
all the protection circuit switches are turned off when operation of the main circuit control circuitry is started.

14. The power conversion device according to claim 12, wherein
the protection circuit switch is turned on when voltage of the voltage-division power storage element connected in parallel to the series unit of the protection circuit switch and the protection circuit resistor has become not less than a product of withstand voltage of a voltage adjustment switching element included in the voltage adjustment circuit connected to the voltage-division power storage element and a reciprocal of two times a number of the voltage-division power storage elements connected to the voltage adjustment circuit.

15. The power conversion device according to claim 12, wherein
the protection circuit switch is driven using power supplied from the main circuit power supply device.

16. The power conversion device according to claim 2, wherein
the voltage adjustment circuit includes at least two voltage adjustment switching elements and at least one magnetic element.

17. The power conversion device according to claim 3, wherein
the voltage adjustment circuit includes at least two voltage adjustment switching elements and at least one magnetic element.

18. The power conversion device according to claim 2, wherein
at least one of the voltage adjustment circuits includes a voltage detection circuit for detecting voltage of at least one of the voltage-division power storage elements, and includes a circuit for controlling the voltage of the voltage-division power storage element to be a constant value, based on a voltage value obtained by the voltage detection circuit.

19. The power conversion device according to claim 2, wherein
the DC/DC converter includes at least one transformer.

20. The power conversion device according to claim 2, wherein
the main circuit power supply device includes, in parallel to each of the voltage-division power storage elements, a protection circuit switch and a protection circuit resistor connected in series.

* * * * *